US007462824B2

(12) United States Patent
Wang

(10) Patent No.: US 7,462,824 B2
(45) Date of Patent: Dec. 9, 2008

(54) COMBINED AMBIENT DESORPTION AND IONIZATION SOURCE FOR MASS SPECTROMETRY

(76) Inventor: Yang Wang, 7 Black Bear La., Westford, MA (US) 01886

( * ) Notice: Subject to any disclaimer, the term of this patent is extended or adjusted under 35 U.S.C. 154(b) by 275 days.

(21) Appl. No.: 11/413,733

(22) Filed: Apr. 28, 2006

(65) Prior Publication Data

US 2008/0067352 A1 Mar. 20, 2008

(51) Int. Cl.
*B01D 59/44* (2006.01)
*H01J 49/00* (2006.01)

(52) U.S. Cl. ....................... 250/288; 250/281; 250/282; 250/283; 250/287; 250/423 R; 250/424; 250/324; 422/907; 436/173

(58) Field of Classification Search ................. 250/281, 250/282, 283, 287, 288, 423 R, 424, 324; 264/22; 422/907; 436/173
See application file for complete search history.

(56) References Cited

OTHER PUBLICATIONS

McEwen Charles N., McKay Richard G., Larsen Barbara S. "Analysis of solids, liquids, and biological tissues using solids probe□□introduction at atmospheric pressure on commercial LC/MS instruments", Anal. Chem. 2005 vol. 77 No. 23, pp. 7826-7831.*

* cited by examiner

*Primary Examiner*—Jack I Berman
*Assistant Examiner*—Meenakshi S Sahu

(57) ABSTRACT

Combined desorption and ionization sources are provided to generate molecular ions form a sample disposed on a substrate surface. A heated gas-jet probe or heated solvent stream probe desorbs sample molecules into the gas phase. The desorbed sample molecules are ionized by reaction between the sample molecule and charged solvent droplets. The charged solvent droplets may be produced by electrospray probe or by a corona discharge. The combined desorption and ionization sources coupled by a vacuum interface to a mass spectrometer, where the sample molecule ions can be analyzed.

13 Claims, 2 Drawing Sheets

COMBINED AMBIENT DESORPTION AND IONIZATION SOURCE FOR MASS SPECTROMETRY

FIELD OF THE INVENTION

The invention relates to mass spectrometric analysis of chemical species that are adsorbed on surfaces of interest. The invention, in particular, relates to mass spectrometry with combined desorption and ionization sources.

BACKGROUND OF THE INVENTION

Mass spectrometry is a method of analyzing gas-phase ions generated from a particle molecular sample. The gas-phase ions are separated in electric and/or magnetic fields according to their mass-to-charge ratio. Analyzing molecular weights of samples using mass spectrometry consists mainly of three processes: generating gas phase ions, separating and analyzing the ions according to their mass-to-charge ratio and detecting the ions. A mass spectrometer is an instrument for implementing these processes to measure the gas-phase mass ions or molecular ions in a vacuum chamber via ionizing the gas molecules and to measure the mass-to-charge ratio of the ions.

Formation of gas phase samples ions is an essential process for the operation of a mass spectrometer. There are many ionization methods and related sources suitable for different kinds of samples. For example, ions may be generated by electron ionization (EI) in vacuum. EI is the most appropriate technique for relatively small (m/z<700) neutral organic molecules that can easily be promoted to the gas phase by heating without decomposition (i.e. volatilization). Electron ionization is achieved through the interaction of an analyte with an energetic electron beam resulting in the loss of an electron from the analyte and the production of a radical cation. Electrons are produced by thermionic emission from a tungsten or rhenium filament. These electrons leave the filament surface and are accelerated towards the ion source chamber, which is held at a positive potential (equal to the accelerating voltage). The electrons acquire energy equal to the voltage, which typically is about 70 electron volts (70 eV), between the filament and the source chamber.

Chemical ionization (CI) is another process for formation of ions. In contrast to EI, most applications of CI produce ions by the relatively gentle process of proton transfer. The sample molecules are exposed to a large excess of ionized reagent gas. Transfer of a proton to a sample molecule M, from an ionized reagent gas such as methane in the form of $CH_5^+$, yields the $[M+H]^+$positive ion. Negative ions can also be produced under chemical ionization conditions. Transfer of a proton from M to other types of reagent gas or ions can leave $[M-H]^-$, a negatively charged sample ion.

Another ion formation process is based on corona discharge ionization. Corona discharge ionization is an electrical discharge characterized by a corona. Corona discharge ionization occurs when one of two electrodes placed in a gas (i.e. a discharge electrode) has a shape causing the electric field on its surface to be significantly greater than that between the electrodes. Corona discharges are usually created in gas held at or near atmospheric pressure. Corona discharge may be positive or negative according to the polarity of the voltage applied to the higher curvature electrode i.e. the discharge electrode. If the discharge electrode is positive with respect to the flat electrode, the discharge is a positive corona, if negative the discharge is a negative corona.

Desorption ionization is a term used to describe the process by which a molecule is both evaporated from a surface and ionized. In field desorption (FD), the sample is coated as a thin film onto a special filament placed within a very high intensity electric field. In this environment, ions created by field-induced removal of an electron from the molecule are extracted into the mass spectrometer. Samples are desorbed and ionized by an impact process that involves bombardment of the sample with high velocity atoms, ions, fission fragments, or photons of relatively high energy. The impact deposits energy into the sample, either directly or via the matrix, and leads to both sample molecule transfer into the gas phase and ionization. Fast atom bombardment (FAB) involves impact of high velocity atoms on a sample dissolved in a liquid matrix. Secondary ion mass spectrometry (SIMS) involves impact of high velocity ions on a thin film of sample on a metal substrate or dissolved in a liquid matrix. Plasma desorption (PD) involves impact of nuclear fission fragments, e.g. from $^{252}Cf$, on a solid sample deposited on a metal foil. Matrix assisted laser desorption ionization (MALDI) involves impact of high energy photons on a sample embedded in a solid organic matrix. Most desorption ionizations undergo in vacuum system, in which molecules embedded on a substrate and introduced are desorbed and ionized using energetic charged particles or laser beams.

Other processes for ion formation are also known. For example, atmospheric pressure ionization (API) can generate sample ions from liquid solution in atmospheric pressure. Electrospray ionization (ESI), introduced by Fenn et al., is a widely used method to produce gaseous ionized molecules desolvated or desorbed from a liquid solution by creating a fine spray of droplets in the presence of a strong electric field. The ESI source consists of a very fine metal emitter or needle, a counter electrode and a series of skimmers. A sample solution is sprayed into the source chamber to form droplets. The droplets carry charge when the exit the capillary and as the solvent vaporizes the droplets disappear leaving highly charged analyte molecules.

Atmospheric pressure chemical ionization (APCI) is a relative of ESI. The ion source is similar to the ESI ion source. In addition to the electro hydrodynamic spraying process, a plasma is created by a corona-discharge needle at the end of the metal capillary. In this plasma, proton transfer reactions and possibly a small amount fragmentation can occur. Depending on the solvents, only quasi-molecular ions like $[M+H]^+$, $[M+Na]^+$and $M^+$(in the case of aromatics), and/or fragments can be produced. Multiply charged molecules, as in ESI, are not observed.

ESI and APCI ionization sources are used almost exclusively for introduction of samples in a liquid flow.

Atmospheric pressure photoionization (APPI) is a complement to ESI and APCI by expanding the range and classes of compounds that can be analyzed, including nonpolar molecules that are not easily ionized by ESI or APCI. The mechanism of photoionization —ejection of an electron following photon absorption by a molecule—is independent of the surrounding molecules, thereby reducing ion suppression effects.

In addition, Plasma and glow discharge, thermal ionization and spark ionization are also used in mass spectrometry.

A few emerging techniques may allow ions to be generated under ambient conditions and then collected and analyzed by mass spectrometry. These techniques do not require sample pretreatment and can be performed under ambient conditions from any surfaces. These techniques include desorption electrospray ionization (DESI), the direct analysis in real time (DART), electrospray-assisted laser desorption/ionization (ELDI) and atmospheric solids analysis probe (ASAP).

The desorption electrospray ionization (DESI) technique involves directing a pneumatically-assisted electrospray, i.e. a fine spray of charged droplets, onto a surface bearing an analyte and collecting the secondary ions generated by interaction of the charged micro-droplets from the electrospray with the neutral molecules of the analyte present on the surface (See e.g., R. Graham Cooks, Zheng Quyang, Zoltan Takats, Justin M. Wiseman, *Science,* 311,1566, 2006). The ions are then delivered into mass spectrometer and are analyzed.

The direct analysis in real time (DART) technique is based on the reactions of electronic or vibronic excited-stat species, i.e. reagent molecules and polar or nonpolar analytes present in the ambient conditions (See e.g. Robert B. Cody, James A. Laramee and H. Dupont Durst, *Anal. Chem.* 77, 2297, 2005). In the DART method, an electrical potential is applied to a gas, typically nitrogen or helium, to form a plasma of excited-stat atoms and ions. After the ions are removed, the gas flow with the electronic or vibronic excited-stat species is directed toward a liquid or solid sample on a surface. Through the reaction, the sample ions are generated and moved into a mass spectrometer to be analyzed. (See U.S. Pat. No. 6,949,741).

Electrospray-assisted laser desorption/ionization (ELDI) uses a laser for desorption of neutral molecules on a surface and use a post-ionization of electrospray (See e.g. Jentaie Shiea, Min-Zon Huang, Hsiu-Jung Hsu, Chi-Yang Lee, Cheng-Hui Yuan, Iwona Beeth and Jan Sunner, *Rapid Commun. Mass Spectrom.* 19, 3701, 2005). Analytes are desorbed from solid metallic and insulating materials under ambient condition. Post-ionization of electrospray produces sample ions to be analyzed by a mass spectrometer.

Atmospheric solids analysis probe (ASAP) uses a heated gas jet directing onto a sample surface (See e.g. Charles N. McEwen, Richard G. McKay, and Barbara S. Larsen, *Anal. Chem.* 77, 7826, 2005). The desorbed species are ionized by corona discharge in the heated gas stream.

Mass analysis in a mass spectrometer can be performed using various mass analyzers that are based on different combinations of electric and/or magnetic fields. A magnetic sector analyzer analyzes ion mass using a static magnetic field to disperse ions according to ion mass. A quadrupole mass filter or quadrupole ion trap (QIT) or quadrupole linear ion trap (LIT) analyzer uses the stability or instability of ion trajectories in a dynamical electric RF field to separate ions according to their different m/z ratios. The quadrupole filter consists of four parallel metal rods. Both radio frequency (RF) voltages and direct current (DC) voltages with opposite polarities are applied across two pair of rods. Ions travel down the quadrupole in between the rods. Only ions of a certain m/z will reach the detector for a given ratio of RF and DC voltages: other ions have unstable oscillations and will collide with the rods. A quadrupole ion trap (QIT) mass analyzer is composed of a metal ring electrode and a pair of opposite metal end cap electrodes. The inner surfaces of the ring and two end cap electrodes are rotationally symmetric hyperboloids. Mass ion is trapped and then analyzed by so-called mass scanning methods.

In a linear ion trap, ions are confined radially by a two-dimensional (2D) RF field and axially by static DC potentials. In contrast to a three-dimensional (3D) ion trap, ions are not confined axially by RF potentials in a linear ion trap. A linear ion trap has a high acceptance since there is no RF quadrupole field along the z-axis. Ions admitted into a pressurized linear quadrupole undergo a series of momentum dissipating collisions effectively reducing axial energy prior to encountering the end of electrodes, thereby enhancing trapping efficiency. A larger volume of the pressurized linear ion trap relative to the 3D device also means that more ions can be trapped. Radial containment of ions within a linear ion trap focuses ions to a line, while the 3D ion trap tends to focus the trapped ions to a point. It has been recognized that ions can be trapped in a linear ion trap and mass selectively ejected in a direction perpendicular to the central axis of the trap via radial excitation techniques, or mass selective axially ejected in the presence of an auxiliary quadrupole field.

A Fourier Transformation Ion Cyclotron Resonance (FT-ICR) mass analyzer is based on the principle of ion cyclotron resonance. An ion placed in a magnetic field will move in a circular orbit at a frequency characteristic of its m/z value. Ions are excited to a coherent orbit using a pulse of radio frequency energy, and their image charge is detected on receiver plates as a time domain signal. Fourier transformation of the time domain signal results in the frequency domain FT-ICR signal which, on the basis of the inverse proportionality between frequency and m/z, can be converted to a mass spectrum.

A Time-of-flight (TOF) mass analyzer separates ions by m/z in a field-free region after accelerating ions to a constant kinetic energy. This acceleration results in any given ion having the same kinetic energy as any other ion. The velocity of the ion will however depend on the mass. The time that it subsequently takes for the particle to reach a detector at a known distance is measured. This time will depend on the mass of the particle (heavier particles reach lower speeds). From this time and the known experimental parameters one can find the mass of the particle.

Tandem mass spectrometry, which is widely applied, involves at least two steps of mass selection or analysis, usually with some form of fragmentation in between. Coupling two stages of mass analysis (MS/MS) can be very useful in identifying compounds in complex mixtures and in determining structures of unknown substances. In product ion scanning, the most frequently used MS/MS mode, product ion spectra of ions of any chosen m/z value represented in the conventional mass spectrum are generated. From a mixture of ions in the source region or collected in an ion trap, ions of a particular m/z value are selected in the first stage of mass analysis. These "parent" or "precursor" ions are fragmented and then the product ions resulting from the fragmentation are analyzed in a second stage of mass analysis. If the sample is a mixture and soft ionization is used to produce, for example, predominantly $[M+H]^+$ions, then the second stage of MS can be used to obtain an identifying mass spectrum for each component in the mixture. For sector, quadrupole and time-of-flight instruments, each stage of mass analysis requires a separate mass analyzer.

A triple quadrupole mass spectrometer uses three quadrupole/multipole devices. The first quadrupole mass analyzer is used for parent ion selection, the second multipole collision cell is used for fragmentation and the third quadrupole is used for analyzing the fragmentation (daughter) ions. The quadrupole/TOF hybrid mass spectrometer, or Q-TOF, replaces the third quadrupole in triple quadrupole with TOF analyzer to give higher resolution and better mass accuracy. For quadrupole ion trap or ICR mass spectrometers, the MS/MS experiment can be conducted sequentially in time within a single mass analyzer. Ions can be selectively isolated, excited and fragmented, and analyzed sequentially in the same device. In addition, hybrid mass spectrometers may include a quadrupole linear ion trap combined with quadrupole ion trap (q-QIT), a quadrupole linear ion trap with FT-ICR, or an quadrupole ion trap with time-of-flight (QIT-TOF).

Consideration is now given improving the design of mass spectrometers. In particular, attention is directed to apparatus and methods of ion formation of surface adsorbed chemical species for mass spectrometry.

SUMMARY OF THE INVENTION

The present invention provides methods and apparatus for mass spectrometry of chemical species adsorbed on surfaces. In particular, the invention provides a combined desorption and ionization source for a mass spectrometer in which the desorption and ionization process can be independently optimized.

In one embodiment of the invention, a nebulizing gas jet, which is heated, desorbs sample molecules on a substrate. Further, electrospray processes are used to ionize the desorbed molecules. The ions then flow into a vacuum interface and are analyzed by a mass spectrometer. The apparatus for this embodiment of the invention, includes, for example, a nebulizing gas probe, a substrate with a surface for carrying the sample chemical species, an electrospray emitter, a vacuum interface, which also is counter electrode, and a mass spectrometer.

In a second embodiment of the invention, a heated solvent stream is directed on to the substrate surface to desorb the sample molecules. Further, corona discharge processes are used to ionize the desorbed molecules. The ions then flow into a vacuum interface and are analyzed by a mass spectrometer. The apparatus for this embodiment of the invention, includes, for example, a solvent flow probe, a substrate with a surface for carrying the sample chemical species, a corona discharge needle, a counter electrode and a mass spectrometer.

The substrate with a surface for carrying the sample chemical species may be made from any suitable materials. The samples for mass analysis may be either solid or liquid phase samples.

Other features, aspects, and advantages of the invention will become apparent from the accompanying description, the drawings, and the claims.

BRIEF DESCRIPTION OF THE DRAWINGS

The invention will be more fully understood from the following detailed description taken in conjunction with the accompanying drawings, in which:

FIG. 1*a* and FIG. 1*b* show top and side views of the combined desorption and ionization source, respectively.

FIG. 1*a* and FIG. 1*b* show top and side views of the combined desorption and ionization source, respectively.

DETAILED DESCRIPTION OF THE INVENTION

The present invention provides a combined ambient desorption and ionization sources for a mass spectrometer. Sample ions generated by sources in ambient conditions are introduced into the mass spectrometer via a vacuum interface.

Two exemplary combined desorption and ionization sources for mass spectrometry under ambient conditions are described herein. For convenience in description and in understanding the invention, only positive ion generation is described in the context of the two examples.

Figure 1A:
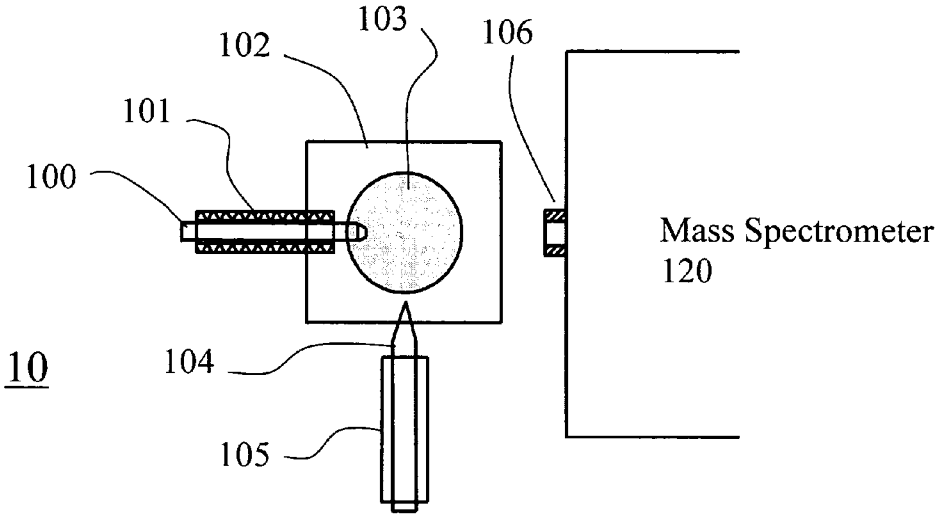
FIGS. 1*a* and 1*b* are schematic illustrations of a combined ambient desorption and ionization source for a mass spectrometer, in accordance with the principles of the present invention. A heated gas-jet probe desorbs the sample on a substrate. The desorbed molecules are reacted with charged solvent ions of an electrospray to form ions.
Figure 1B:
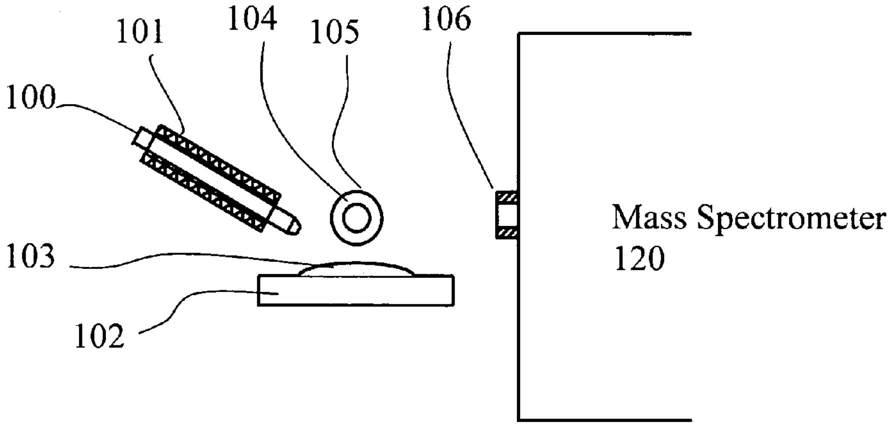

FIGS. 1*a* and 1*b* show an exemplary combined desorption and ionization source 10 for mass spectrometry. Source 10, which is operable under ambient conditions, is based on electrospray ionization. (ESI). In conventional ESI technique, ionization is effected by the use of the emitter, i.e. a metal needle or a metal capillary tube, at a controlled distance from a counter electrode. A DC voltage is applied, either to the emitter or to the solvent, to produce a strong electrical field at the emitter tip. The electric field interacts with ions in solution as they leave the tip. This interaction results in electro hydrodynamic disintegration of the fluid, generation of droplets, and formation of an aerosol jet. A drying gas is often used to expedite desolvation and droplet shrinkage. By solvent evaporation and repeated disintegration, the process proceeds by progressive droplet diminution. Differential solvent loss reduces droplet size, which in turn in turn increases electrical surface charge. Finally, when the charge repulsion forces of the ion exceed the surface tension of the droplet, the latter bursts apart by Coulomb explosion. When the droplet diameter diminishes in radius, ion emission to the gas phase occurs under the conditions in which the solvation energy of the ion exceeds the attraction between the ion and polarizable droplet. The molecular ions are usually multiply charged. Electrospray ionization is the method of choice for proteins, peptides and oligonucleotides. However, the sample must be soluble in low boiling solvents (e.g., acetonitrile, MeOH, $CH_3Cl$, water, etc.) and electro sprayed with solvent through the needle or emitter.

In the present invention, however, sample molecules or analytes are not in a solution with a solvent that can be sprayed together. Instead, the sample molecules, which are placed on a substrate, are desorbed by a heated gas jet and then ionized by an electro sprayed solvent in an electrospray process. Sample molecule ions are generated through reaction between desorbed molecules and charged solvent ions.

Combined desorption and ionization source 10 includes a heated gas-jet probe 100, an electrospray probe, a sample substrate 102 for carrying a sample 103. The electrospray probe includes a thin capillary 104 and a tune 105. Thin capillary tube 104 carries a flowing solvent while tube 105 carries nebulizing gas for generating a solvent spray. A vacuum interface 106, which also serves as a counter electrode, allows passage of sample molecule ions into the body of mass spectrometer 120 for analysis. Heated gas-jet probe 100 and the electrospray probe are located above the sample substrate 102 at suitable angles and distances to the substrate. Nebulizing gas such as nitrogen gas, streams through the gas-jet probe 101 and is directed onto sample 103. A heating unit 101, heats the flowing gas stream. The energetic gas stream impacts sample 103 and desorbs sample molecules into gas phase. Simultaneously, a solvent is pumped through thin capillary 104, which may have an internal diameter of about 0.1 mm. The solvent is pumped through thin capillary 104 and sprayed by assisted nebulizing gas through the tube 105. Further, thin capillary 104 is raised to a high potential of about a few kV. Small charged solvent droplets are sprayed from the end of thin capillary 104 into a bath gas at atmospheric pressure and travel towards an orifice of vacuum interface 106 leading into mass spectrometer 120. As the charged droplets traverse this path, they become desolvated and reduced in size to such an extent that surface-columbic forces overcome surface-tension forces. Then, the charged droplets break up into even smaller charged droplets. The small charged droplets react with the desorbed sample molecules. The reaction between the small charged solvent and the desorbed sample molecules may include proton transfer from charged solvent to sample molecule and sample molecule fusion into charged solvent droplet. The electrospray process leads to even smaller charged droplets. The further droplet shrinkage leads to gas-phase ion generation.

The gas-phase ions are sampled by mass spectrometer 120, which may include a suitable analyzer such as a quadrupole mass filter or quadrupole ion trap (QIT) or quadrupole linear ion trap (LIT); a Fourier Transformation Ion Cyclotron Resonance (FT-ICR), a Time-of-flight (TOF), a triple quadrupole or a Q-TOF mass spectrometer.

A more detailed theoretical description of the traditional electrospray process is found in: *Electrospray Ionization Mass spectrometry,* edited by Richard B. Cole, John Wile $Sons, Inc, New York, 1997. However, the traditional electrospray ionization source is related to a solution (solvent with sample) spray from the capillary.

The desorption and ionization source 10 shown in FIGS. 1*a* and 1*b* differs from the traditional DESI sources and ELDI sources. In a DESI source, the charged droplets, which are formed from ESI probe, are directed to the sample on the substrate. Both desorption and ionization processes are carried out by an ESI beam. In an ELDI source, the desorption is obtained using a laser beam. In contrast in the inventive source 10 shown in FIGS. 1*a* and 1*b*, desorption is obtained by a heated jet-gas. The desorbed molecules react with the charged solvent to form molecule ions.

The desorption and ionization source 10 shown in FIGS. 1*a* and 1*b* also differs from the traditional ASAP sources and DART sources. An ASAP source does not involve electrospray processes for ion formation. In a DART source, molecule ions are generated by the reactions of electronic or vibronic excited-stat species ((metastable helium atoms or nitrogen molecule) with sample molecules.

Figure 2A:
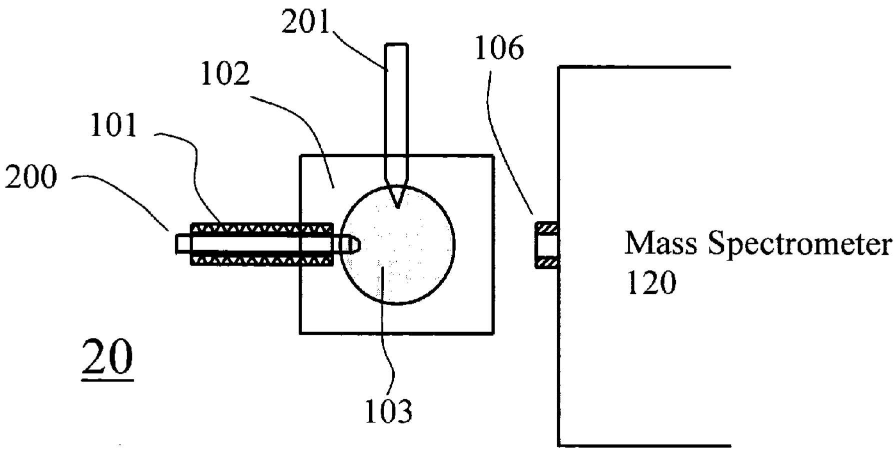
FIGS. 2*a* and 2*b* are schematic illustrations of another combined ambient desorption and ionization source for a mass spectrometer, in accordance with the principles of the present invention. A heated solvent stream probe desorbs the sample on a substrate. The desorbed molecules are ionized by a corona discharge.
Figure 2B:
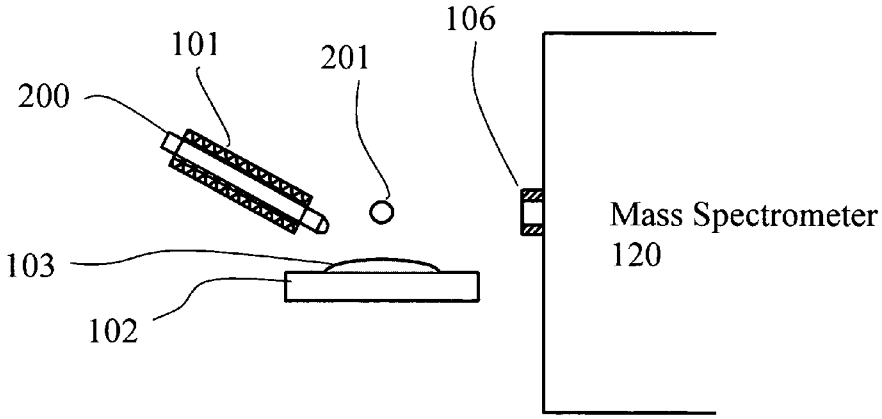

FIGS. 2*a* and 2*b* show another exemplary combined desorption and ionization source 20 for mass spectrometry. Source 20 uses a corona discharge (APCI) for ion formation.

Source 20, which is operable under ambient conditions, is based on APCI process, which is related to the electrospray ionization process (ESI). Source 20 uses a heated nebulizing solvent beam for desorption of sample molecules. Source 20 includes a heated solvent stream probe 200, a corona discharge needle 201, a vacuum interface 106, which is also a counter electrode, and a sample substrate 102 (with sample 103 on it). Heated solvent stream probe 200 and corona discharge needle 201 are located above sample substrate 102 at appropriate angles and distances to the substrate.

In operation of source 20, a solvent (e.g. water, organic liquid or water/organic mixture and a small amount of acid) flows through probe 200, and is directed on to sample 103. A heating unit 101 heats the flowing solvent. The energetic solvent stream impacts sample 103 and desorbs sample molecules into the gas phase mixed with the solvent. Corona discharge needle 201 is maintained at potential of a about few kilovolts. The corona effect describes the partial discharge around a conductor placed at a high potential. This leads to ionization and electrical breakdown of the atmosphere surrounding the conductor. As in the case of an APCI source, the atmosphere surrounding the corona electrode consists mainly in the vapors from desorption. The vapors are ionized by the corona effect, and react chemically with the sample molecules in the gas-phase.

Source 20 may be operated in a positive mode or a negative mode. For positive mode operation, the proton affinity of the analyte must be higher than the proton affinity of the eluent (in other words, the analyte can capture a proton from the protonated solvent):

$$SH^{+}+M \rightarrow S+MH^{+}$$

where S is solvent, $H^{+}$is proton and M is sample molecule.

For negative mode operation, the gas phase acidity of the analyte must be lower than the gas phase acidity of the eluent (in other words, the analyte can give a proton to the deprotonated solvent):

$$[S-H]^{-}+M \rightarrow S+[M-H]^{-}$$

In either mode, the result is the formation of sample molecule ions. The sample molecule ions flow into the orifice of the vacuum interface 106 and are analyzed by a mass spectrometer 120 as mention above.

The desorption and ionization source 20 shown in FIGS. 2*a* and 2*b* differs from the traditional DESI sources and ELDI sources. In a DESI source, the charged droplets which are formed by an ESI probe are directed to the sample on the substrate. Both desorption and ionization processes are carried out by an ESI beam. In an ELDI source, the desorption is done by a laser beam and the ionization is done by ESI. In contrast in source 20, the desorption is obtained using a non-charged solvent stream. The sample molecule ions are then generated by corona discharge assisted by chemical reaction.

The desorption and ionization source 20 shown in FIGS. 2*a* and 2*b* differs from the traditional ASAP sources and DART sources. In an ASAP source, the desorption of sample molecules is obtained by nebulizing gas, but ion formation does not involve chemical reaction between solvent and sample molecule. In a DART source, molecule ions are generated by the reactions of electronic or vibronic excited-stat species (metastable helium atoms or nitrogen molecule) with sample molecules. In contrast, in source 20 molecule ions are generated by proton transfer to or from the solvent.

Another exemplary combined desorption and ionization source merges features of sources 10 and 20 that are shown in FIGS. 1*a*-2*b*. This exemplary source may, for example, like source 20 (FIGS. 2*a* and 2*b*), utilize a solvent stream to desorb sample molecules. The desorbed sample molecules and mixture of solvent may then be ionized utilizing the solvent electrospray process described with reference to source 10 (FIGS. 1*a* and 1*b*).

It will be understood that in the inventive sources, desorption and ionization processes are separated. The separation of the two processes allows each process to be independently optimized. The two processes may be optimized to obtain optimal molecular ion yield for mass spectrometry and to eliminate chemical noise peaks.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the invention is reserved.

The invention claimed is:

1. A combined ambient desorption and ionization source, comprising:

a heated gas-jet probe;

an electrospray probe; and a substrate for holding a sample on it surface, wherein the heated gas-jet probe is configured to direct a gas jet onto the a substrate for desorbing sample molecules into the gas-phase, and wherein the electrospray is configured to generate charged solvent droplets that can react with the desorbed sample molecule to generate sample molecule ions.

2. The combined ambient desorption and ionization source of the claim 1, wherein the source is under ambient condition.

3. The combined ambient desorption and ionization source of the claim 1, wherein the electrospray probe is biased positively or negatively to generate positive or negative ions, respectively.

4. The combined ambient desorption and ionization source of the claim 1, further comprising a vacuum interface to a mass spectrometer.

5. The combined ambient desorption and ionization source of the claim 4, wherein the mass spectrometer is one of a quadrupole mass filter, quadrupole ion trap (QIT), quadrupole linear ion trap (LIT), a Fourier Transformation Ion Cyclotron Resonance (FT-ICR), a Time-of-flight (TOF), a triple quadrupole, and a Q-TOF mass spectrometer.

6. The combined ambient desorption and ionization source of the claim 1, wherein the heated gas-jet probe is configured for use as a heated solvent stream probe to direct a solvent stream onto a substrate for desorbing sample molecules into the gas-phase.

7. A combined ambient desorption and ionization source comprising:

a heated solvent stream probe;

a corona discharge needle; and a substrate for holding a sample on it surface, wherein the heated solvent stream probe is configured to direct a solvent stream onto the a substrate for desorbing sample molecules into the gas-phase, and wherein the corona discharge needle is configured to ionize the solvent, so that the charged solvent reacts with the desorbed sample molecule to generate sample molecule ions.

8. The combined ambient desorption and ionization source of the claim 7, wherein the source is under ambient condition.

9. The combined ambient desorption and ionization source of the claim 7, wherein the corona discharge is applied a positive or negative potential to generate positive or negative ions, respectively.

10. The combined ambient desorption and ionization source of the claim 7, further comprising a vacuum interface to a mass spectrometer.

11. The combined ambient desorption and ionization source of the claim 10, wherein the mass spectrometer is one of a quadrupole mass filter, quadrupole ion trap (QIT), quadrupole linear ion trap (LIT), a Fourier Transformation Ion Cyclotron Resonance (FT-ICR), a Time-of-flight (TOF), a triple quadrupole, and a Q-TOF mass spectrometer.

12. The combined ambient desorption and ionization source of the claim 7, wherein the heated solvent stream probe is configured for use as a gas jet probe to direct a gas jet onto a substrate for desorbing sample molecules into the gas-phase.

13. A combined ambient desorption and ionization source comprising:

a heated gas-jet probe;

an electrospray probe;

a heated solvent stream probe;

a corona discharge needle; and a substrate for holding a sample on it surface, wherein the heated gas-jet probe is configured to direct a gas jet onto the a substrate for desorbing sample molecules into the gas-phase, wherein the electrospray is configured to generate charged solvent droplets that can react with the desorbed sample molecule to generate sample molecule ions, wherein the heated solvent stream probe is configured to direct a solvent stream onto the a substrate for desorbing sample molecules into the gas-phase, and wherein the corona discharge needle is configured to ionize the solvent, so that the charged solvent reacts with the desorbed sample molecule to generate sample molecule ions.

* * * * *